United States Patent Office 3,489,910
Patented Jan. 13, 1970

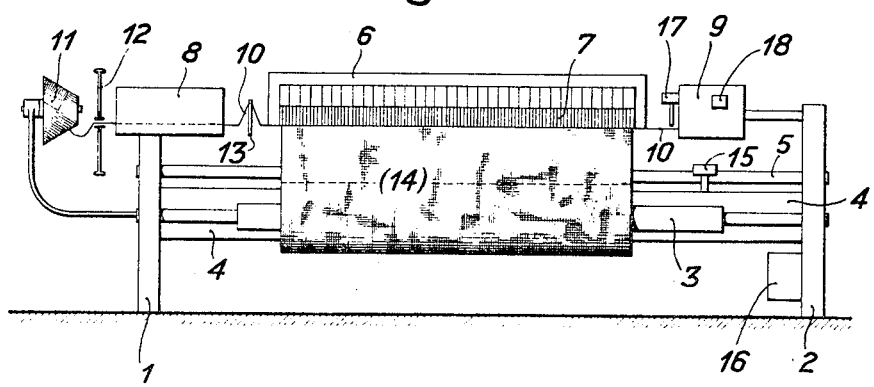
Fig. 1
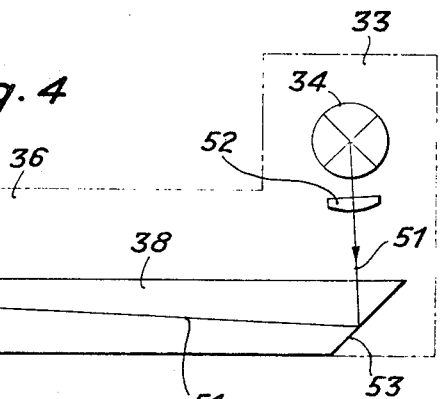
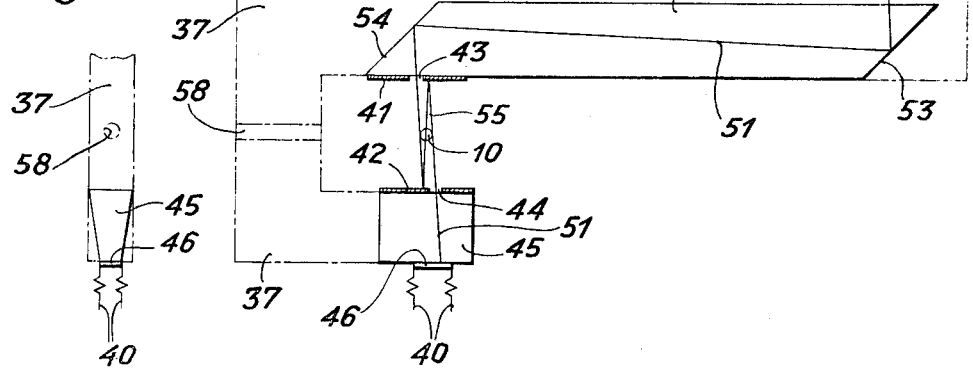
Fig. 4
Fig. 4a
Inventors.
Rudolf Böhme
Gerhard Bröckel

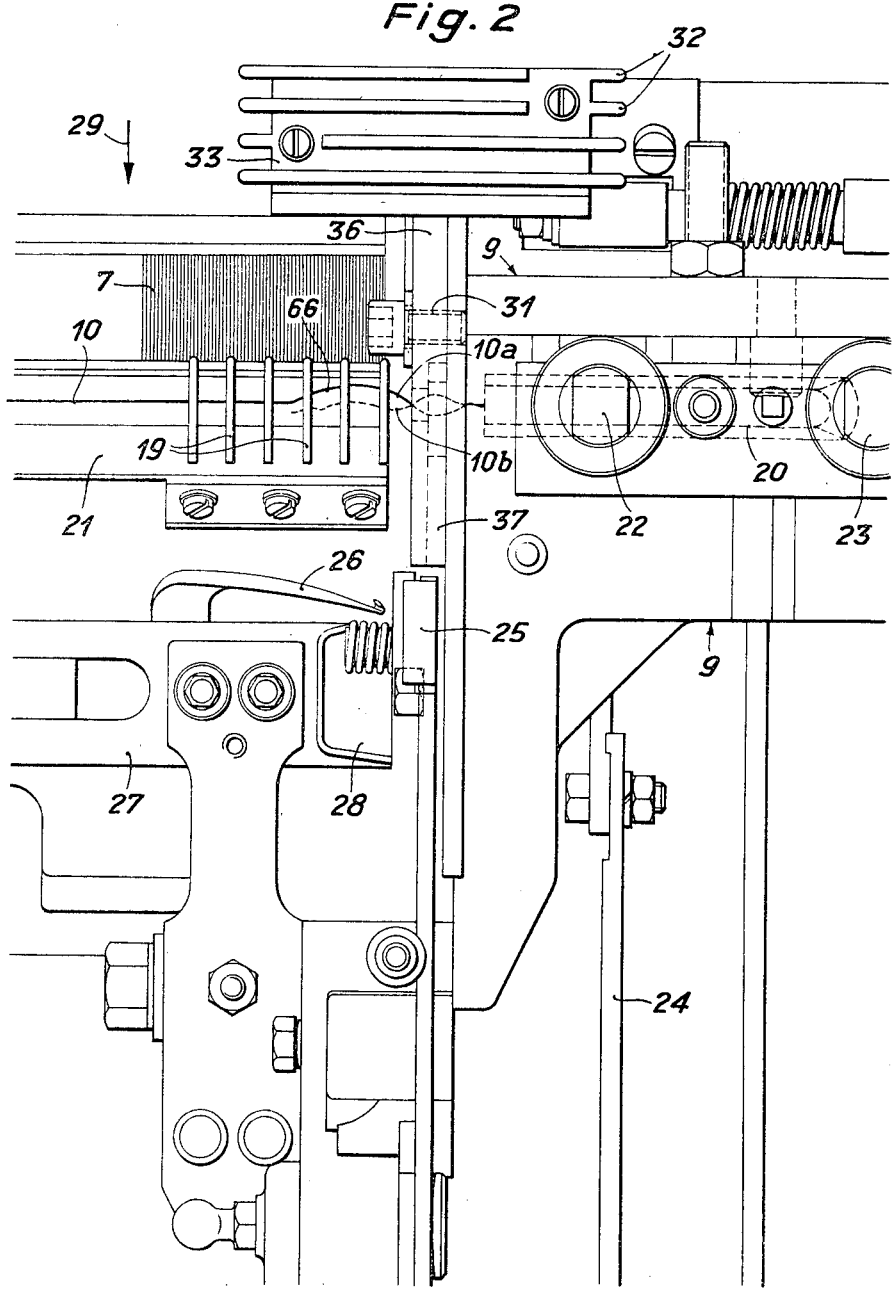

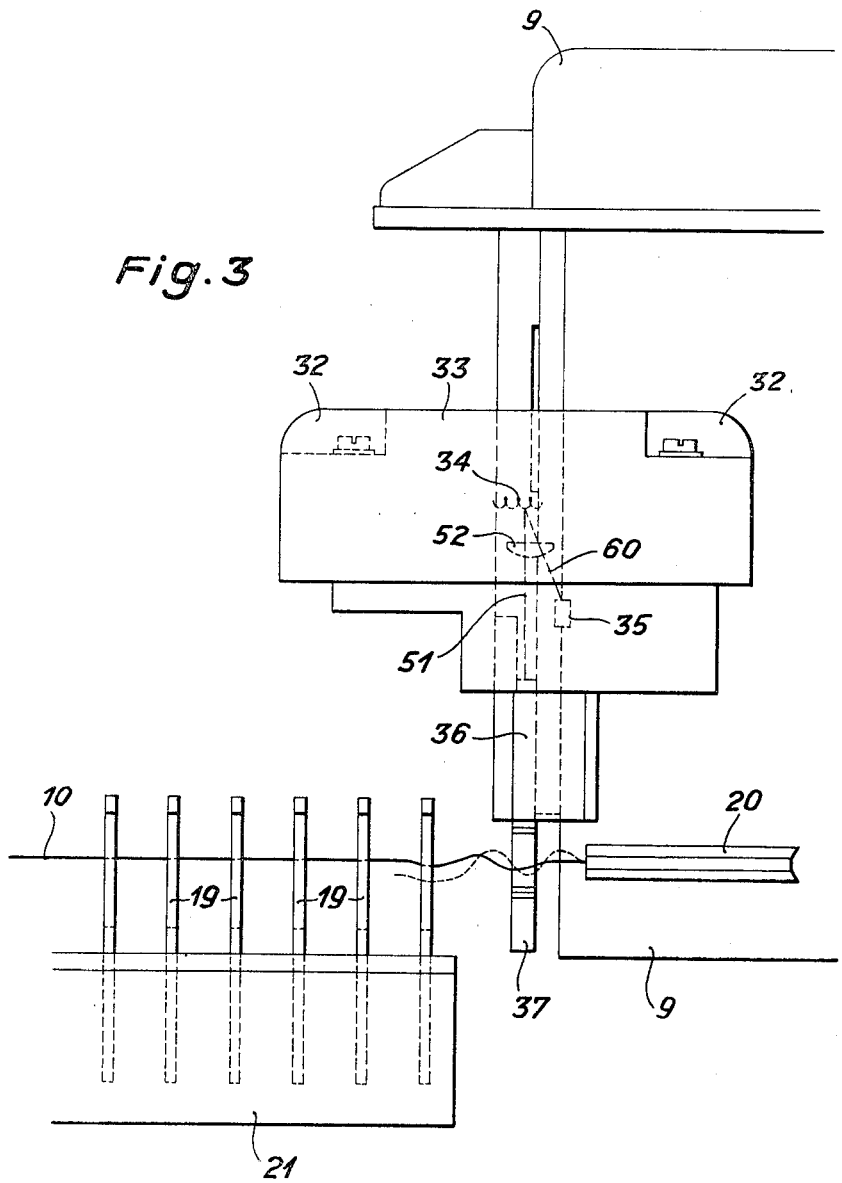

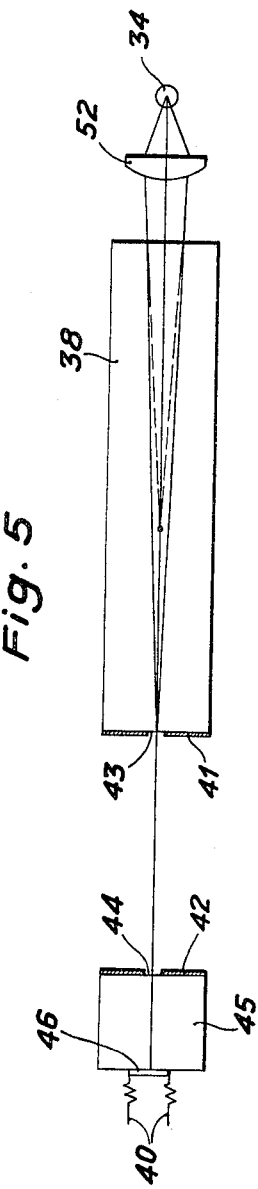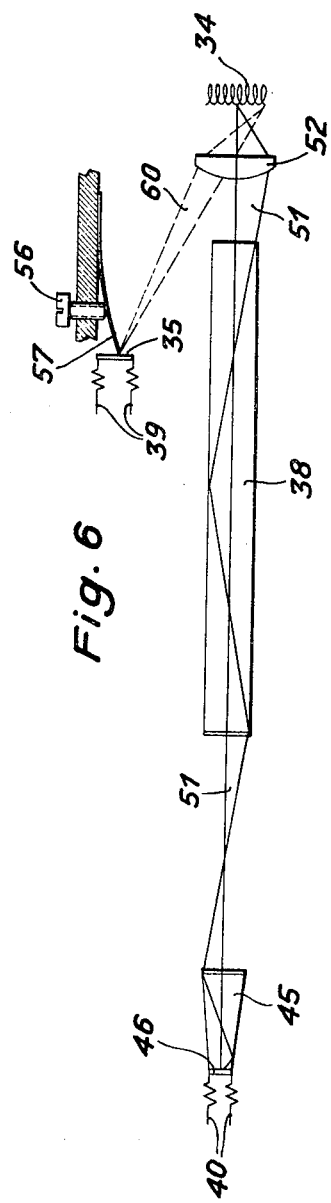

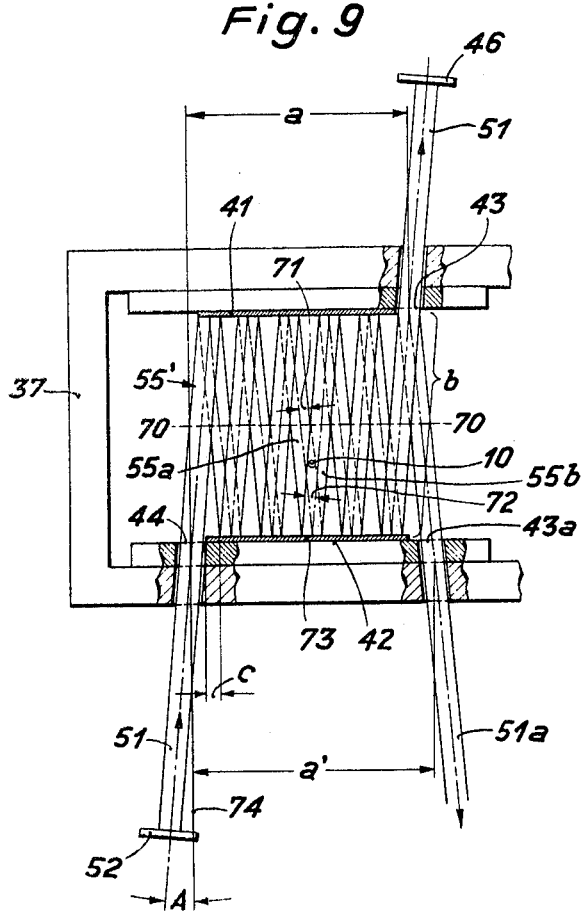
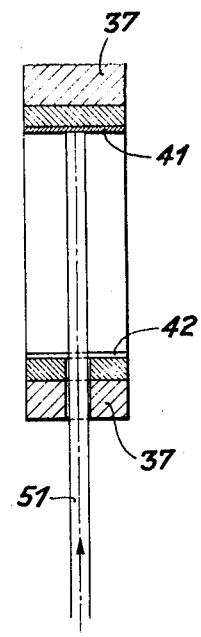

3,489,910
OPTICAL WEFT THREAD MONITORING APPARATUS FOR LOOMS EMPLOYING MULTIPLE REFLECTIONS OF A LIGHT BEAM
Rudolf Böhme, Goldach, and Gerhard Bröckel, Winterthur, Switzerland, assignors to Sulzer Brothers Limited, Winterthur, Switzerland, a Swiss company
Filed Feb. 18, 1966, Ser. No. 528,616
Claims priority, application Switzerland, Feb. 25, 1965, 2,572/65
Int. Cl. G01n 21/30
U.S. Cl. 250—219                                              10 Claims

ABSTRACT OF THE DISCLOSURE

To monitor the weft thread in a loom against breakage, a light beam focused on one of two spaced parallel plane mirrors is reflected a plurality of times at those mirrors and at small angles of incidence such that at each reflection the reflected beam returns at least half way toward the other mirror before clearing the incident beam. The beam so repeatedly reflected defines a plane which is disposed transversely of the weft thread path, and in consequence of the small angles of incidence and reflection in conjunction with the width of the beam in that plane, there is formed a region in this plane, midway between the two mirrors, completely filled by the successive segments of the multiply reflected beam. A weft thread passing through the plane anywhere in this region attenuates the beam as perceived by a photocell after the last reflection and thus indicates unbroken condition of the thread.

---

The present invention pertains to a loom having an optical weft thread monitoring device.

In known apparatus of this character the test or monitoring beam of light is directed to a photocell along either a straight path or along a path including one reflection. By means of this photocell, the loom is to be stopped in the event that the beam is able to reach the photocell, being not interrupted by the thread or yarn in the event of breakage thereof. It is also known to permit the beam to fall at right angles on the direction of picking, i.e. of weft thread passage, and to be reflected once back along the same path by a reflector disposed behind the path of the weft thread, whereafter the beam passes to a photocell by a subsequent reflection outside the path of the weft thread.

In these known machines, the weft thread or yarn does not dependably intercept the test beam because the shuttle is not always introduced into the shed at exactly the same location. The present invention provides a loom having a dependable optical weft thread monitoring device.

In accordance with the invention, there are provided at the weft thread position two mutually opposed reflectors and a source which sends a monitoring beam of electro-magnetic radiation between the mirrors. The source and the two reflectors are so positioned that by multiple reflection of the beam at the reflectors, the beam is formed into a "curtain" or sheet extending crosswise of the weft thread position, the beam after formation of this sheet being directed to a photoelectric cell by whose operation the loom is stopped in the event of a broken weft thread or yarn. Although reference has been made to a sheet or curtain of radiation, it is to be understood that this sheet is made up of a single narrow beam having plural series-connected segments, so that interruption of the beam at any point on any one of these segments prevents illumination of the photocell, and thereby allows the loom to continue to operate.

By appropriate positioning of the two reflectors with respect to each other, the horizontal width of the sheet transversely of the direction of shuttle motion is given a certain length such as for example from two to five millimeters. This horizontal width is made up of plural side-by-side vertical or nearly vertical beam segments, the mirrors having substantially horizontal reflecting surfaces. The separation of the mirrors must in any event amount to some ten to fifteen millimeters since the gripper shuttle passes between the two reflectors. A properly inserted and untorn weft thread consequently passes with dependability through the beam "sheet," so that the beam which makes up the sheet will be interrupted at some point on the plural-segment beam path produced by the multiple reflections at the mirrors.

With the invention therefore there cannot occur stoppage of the loom without breakage of the yarn such as sometimes occurs in prior art constructions of looms with optical weft thread monitoring devices. Oscillation of the weft thread during the course of its passage through the shed and small variations in the position of the weft thread unavoidably occurring in operation of the loom are without adverse effect on the monitoring device of the invention.

In one embodiment of the invention, the two reflectors are disposed on a single fork-shaped element embracing the weft thread path. With such a construction the two reflectors need not be independently mounted on the loom frame for separate adjustments but rather require a single adjustment with respect to each other before their assembly into the loom.

Advantageously, the fork-shaped reflector element and the housing containing the radiation source are constructed as a single unit, mounted as a unit on the loom. Assembly is in this way facilitated and the monitor can moreover be applied at any time to a previously delivered loom.

In one embodiment of the invention, an air blast nozzle is provided on the beam sheet developing means for removal of broken or loosely hanging weft threads out of the beam path. Such a nozzle prevents broken ends of weft threads from remaining within the beam path and from thereby continuing operation of the loom notwithstanding breakage of the actual weft thread being woven.

The invention will now be further described in terms of a number of exemplary embodiments with reference to the accompanying drawings in which:

FIG. 1 is a schematic representation of a gripper shuttle loom according to the invention seen from the cloth end;

FIG. 2 is a view in elevation of a portion of the machine of FIG. 1;

FIG. 3 is a diagrammatic view in side elevation of the elements of FIG. 2 seen from below;

FIG. 4 shows a detail of the apparatus of FIGS. 2 and 3 in diagrammatic form;

FIG. 4a is a fragmentary view in end elevation of the apparatus shown in FIG. 4;

FIG. 5 is a diagrammatic view of the apparatus of FIG. 4, the beam path being however shown in developed form;

FIG. 6 is a developed diagrammatic view of the apparatus of FIG. 4 similar to that of FIG. 5, but rotated 90° about the optical axis from the position shown in FIG. 5;

FIG. 9 shows a modification of the apparatus of FIG. 4 represented however at a larger scale; and FIG. 10 is a vertical section of the apparatus of FIG. 9.

Figure 7:
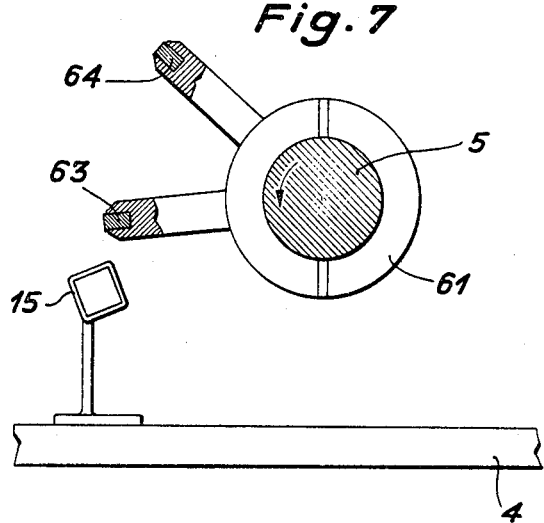
FIG. 7 shows further detail of the loom, partly in section.

Referring to FIG. 1, the loom is shown as having two uprights 1 and 2 between which are mounted a warp thread beam, not visible in FIG. 1, a cloth beam 3, and guiding and tightening apparatus for the warp and cloth beams not shown. The loom additionally includes an intermediate member 4 coupling the uprights 1 and 2 together, and a main drive shaft 5. In addition, there are visible in FIG. 1 a heddle frame 6 belonging to a shed-forming apparatus, and a reed 7.

A picking mechanism 8 is shown on the upright 1 and the corresponding catcher 9 is shown at the right. The weft thread is denoted by a reference character 10, applied to a line which may also serve to represent the flight path of the shuttle. The weft thread 10 is fed into the shed from a supply spool 11 fixedly mounted outside the shed from which it passes through a brake 12 and an upwardly and downwardly reciprocable thread-tensioning device 13.

After each pick, and after the shuttle has been caught in the catching mechanism or catcher 9, the shuttle will be moved backwards a short distance so that at the end of each pick it will come to occupy exactly the same position. In this process, the thread tensioner 13 will be raised to its upper position so that the weft thread will remain tight even upon this backward movement of the shuttle. By means of thread brakes not shown, precautions are taken during this backward motion of the shuttle that the additional thread length thus required at the thread tensioner 13 is provided primarily by a withdrawal of the whole weft thread as it lies across the shed. So far as is necessary a short length of additional thread will be drawn off of the spool 11 for this purpose.

After the rearward motion of the shuttle and of the weft thread, the latter is severed on the picking side of the loom by means of a shear. After beating up of the weft thread and reversal of the shed, the protruding ends of the weft thread are tucked into the next shed by means of inserting mechanism. The cloth 14 is then wound up onto the cloth beam.

The catcher 9 has mounted thereon the scanning head 17 of a weft thread monitoring device to be further described below. The catcher additionally has mounted thereon a loom-stopping device generally indicated at 18, responsive to operation of the weft thread monitoring device. Additionally, the intermediate member 4 supports an induction device 15 comprising essentially an induction coil, and the upright 2 supports an electrical amplifier 16, all to be further described hereinafter.

The reed 7 and a shuttle race made up of numerous guide teeth 19 (FIG. 2) are fixed to the sley 21. The catcher also includes (FIG. 2) two brakes 22 and 23 for the shuttle 20 (shown in dashed lines), a drive bar 24 for a thread end clamp 25, a tuck-in needle 26, and a cloth width control device 28 disposed beneath a cover 27. The warp threads and the cloth are advanced in the direction indicated by the arrow 29 in FIG. 2.

A housing 33 forming part of the scanning head 17 and having cooling fins 32 thereon is supported on the catcher 9 by means of a screw 31. This scanning head contains a light source 34 (FIG. 4) and a comparison photocell 35 (FIGS. 3 and 6). The cell 35 and its terminals 39 are coupled to an amplifier 16. The voltage generated by the cell upon illumination thereof appears at these terminals. An arm 36 is affixed to the housing 33, this arm having a fork-shaped extension 37. The arm 36 also supports a glass prism 38 (FIG. 4), and two mirrors 41 and 42 are disposed at opposite surfaces on the fork-shaped member 37. The mirrors are provided with grooves or slits 43 and 44 respectively (FIG. 4). At the free end of the fork-shaped member is provided a wedge shaped prism 45 of glass and beneath that prism is disposed a photocell 46. The cell 46 and its voltage terminals 40 are also connected to the amplifier 16.

Referring to FIG. 4, the test beam 51 from source 34 passes through a convergent lens 52 and falls on the prism 38. It is then reflected at the oblique face 53 of this prism and passes through the interior of the prism to be reflected a second time at the second oblique face 54 of the prism. By means of the lens 52 there is formed an image of the source 34, advantageously in the slit 43 (FIG. 5). In the perpendicular meridian of FIG. 6, the light undergoes plural reflections at the side faces of the prism. In this way, the bundle of rays entering the prism is led or directed to exit from the prism, so that there is achieved a conduit of light to the scanning position beyond the slit 43.

At the end of the prism 38 the light beam passes out through the slit 43 and into the space between the mirrors 41 and 42 at which, upon repeated reflection, it forms a curtain, fan or sheet 55 of closely spaced nearly parallel beam segments. At the end of the fan the beam 51 passes through the slit 44 and the wedge-shaped prism 45 to the photocell 46. The prism 45 has a convergent effect similar to that of the prism 38.

A portion 60 of the light from the source 34 is directed to the comparison photocell 35 as shown in FIG. 6. By means of an opaque screen 57 which can be adjusted by means of a screw 56, the quantity of light falling on the comparison cell 35 can be adjusted.

The light curtain 55 embraces the weft thread path, and consequently the weft thread 10 passes through it. According to the positioning of the mirrors 41 and 42, the disposition of the slits 43 and 44 and the relatively oblique or perpendicular incidence of the beam 51 on the mirror 48 at its emergence from the prism 38, the width of the curtain parallel to the mirrors and in the plane of FIG. 4 can be made greater or lesser.

The fork-shaped member 37 supports an air nozzle 58 through which air can be blown into the position of the curtain 55. The air may be supplied in a continuous or intermittent stream, for example, at the times of testing for presence of the weft thread.

Figure 8:
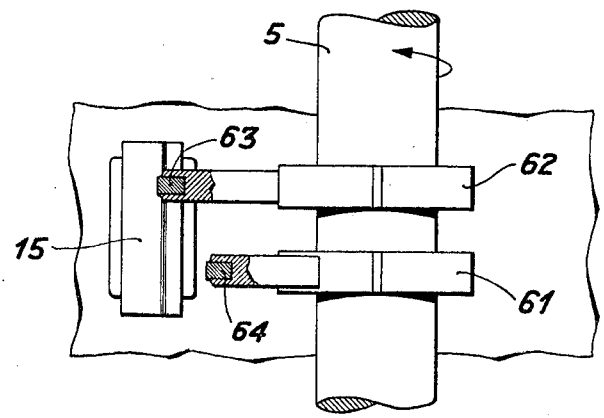
FIG. 8 is a plan view of the apparatus of FIG. 7.

Two permanent magnets 63 and 64 are fastened by means of rings 61 and 62 to the main shaft 5 of the loom (FIGS. 7 and 8). These cooperate with the induction coil 15 schematically shown, this coil being affixed to the intermediate bar 4 of the loom. The two magnets are so positioned on the shaft 5 that one of the magnets 63 passes the coil at a position of, for example, 305° of the main shaft rotation whereas the following magnet 64 passes the coil for an angular position of, for example, 330° of the shaft 5. The shaft 5 rotates once for each pick of the loom.

The mode of operation of the apparatus is as follows: Before setting the loom into operation, i.e., when no weft thread is present in the weft thread passage, the beam 60 to the reference cell 35 is adjusted to a suitable intensity, which is small in comparison with the intensity of the beam 51 (large difference of intensity between the two light beams 51 and 60), as determined by experience. The loom is thereupon set into operation. At the end of each pick, when the shuttle has been brought to rest by the brakes 22 and 23, the weft thread, though unruptured, will in view of its momentum have accumulated a certain bowing or slack as illustrated at 66 in FIG. 2. Thereupon, the shuttle will be returned a short distance to the left in FIG. 2 by means of a reversing mechanism, not shown, back to a position which is always the same but which represents a non-stretched condition for the weft thread. At this same moment, the thread tensioner 37 of FIG. 1 moves to its upper position so that the whole weft thread is drawn to the left in FIGS. 1 and 2 to be stretched so as to eliminate the bowing 66.

While the weft thread is held taut, the magnet 63 passes in front of the coil 15 so as to deliver a first voltage pulse from the coil to the amplifier 16. The amplifier 16 is thus energized or keyed on, and amplifies the signal voltages from the photocells 35 and 40 both presented to it and measures the difference between them. The mode of operation of the amplifier 16 is such that in the event of a large difference between the two photocell voltages applied to it (i.e., in the event of a large difference of intensity between the two light beams 51 and 60 as incident on the photocells), the loom will be brought to rest by means of the mechanism 18. On the contrary, if the amplifier 16 detects only a small difference between the voltages from the cells 46 and 35, the loom will not be stopped. A large difference will be observed or detected if there is no weft thread in the light sheet 55, i.e., in the event of a broken weft thread.

The rearward motion of shuttle 20 and of the weft thread 10 continues until the magnet 64 passes adjacent the induction coil 15. At this time, a second voltage pulse is supplied by the coil to the amplifier reducing the amplification factor of the latter. Thus, the weft thread is effectively observed only during the short time of backward motion of the shuttle.

If the weft thread is broken, the loose end of the thread will be removed from the light path 55 by operation of the air nozzle so that no thread will be present, at the time of scanning (i.e., during the rearward motion of the shuttle) in any position where it can interrupt the beam 51 in any part of the fan 55. The photocells 46 and 35 will then receive unlike illuminations so that voltage pulses of widely different amplitudes will be supplied by the photocells to the amplifier. The stoppage device 18 will thereupon bring the loom to a halt.

In the modified embodiment of FIGS. 9 and 10, the light fan 55′ formed at mirrors 41 and 42 on fork-shaped member 37 includes ten reflections at the two mirrors 41 and 42 so that the light beam itself includes eleven segments. The two mirrors 41 and 42 are disposed exactly parallel to each other, but the beam 51 which now enters from below through slit 44 is in this embodiment inclined at a small angle A to the vertical 74. The inclination is so chosen that the beam segments which make up the light fan or curtain lie very closely to each other, so closely that at each reflection of the beam, the beam will have advanced laterally by its own width by the time it has returned half way to the other mirror, i.e., at 70 in FIG. 9.

The weft thread 10 shown in FIG. 9 is assumed to be very thin. If it occupies during scanning (i.e., during the energized time of amplifier 16) the position indicated for it in FIG. 9, it will mask off the right half 71 of the downwardly directed beam segment 55a and the left half 72 of the next following upwardly directed beam segment 55b produced by reflection of segment 55a at position 73 on mirror 42. In this way, despite the thinness of the thread 10, the intensity of the beam 51 emerging through slit 43 towards photocell 46 will be greatly diminished. Thus cell 46 will receive only a small amount of light.

The horizontal displacement of the beam 51 emerging at slit 43 and entering at slit 44 is indicated at $a$ in FIG. 9. In a variant construction, the beam may emerge from between the mirrors at a slit 43a in mirror 42 after a supplementary reflection from mirror 41, continued over the location of the slit 43. In this case, the separation of the emergent beam 51a from the entering beam 51 is indicated at $a'$.

If the beam 51 passes through the slit 44 in a direction exactly perpendicular to either of the mirrors 41 and 42 so that the angle A is equal to zero, then the mirror 41 will possess a small inclination with respect to mirror 42.

The mirror producing the first reflection after entry of the beam into the space between the mirrors, i.e. the mirror 41 in the construction FIG. 9, can be so disposed that its position is adjustable. In this way, both the horizontal length $a$ of the light curtain and also the closeness to each other of the successive beam segments in the curtain may be varied. If the weft yarn is thick, the spacing $c$, FIG. 9, between adjacent beam segments at either mirror may be made relatively large. If on the contrary, the weft thread is very thin, then this spacing $c$ must be made small or indeed reduced to zero. In such a case the curtain will fill the entire area $a \times b$ and not only an area of width $a$ but of height limited to a part of the distance between the center line 70 and each of the mirrors.

It is apparent from the embodiment of FIG. 9 that the light beam can be directed upwardly into the space of the light curtain and that the air nozzle is not essential. Experience has shown that in most cases, a broken weft thread will be so far carried out of the shuttle path 10 upon sudden breaking of the shuttle that it is no longer disposed in the light curtain so that the monitoring device will operate dependably.

In place of light beams, other electromagnetic radiations can be employed, ultra-violet, for example.

While the invention has been described herein in terms of two presently preferred embodiments, the invention itself is not limited thereto, but rather comprehends all modifications on and departures therefrom falling within the spirit and scope of the appended claims.

We claim:

1. Weft thread monitoring apparatus for a loom comprising a source of electromagnetic radiation and two mutually opposed mirrors so positioned with respect to said source that a beam from said source is reflected a plurality of times at said mirrors to form adjacent beam segments transverse to the direction of weft thread insertion in the loom and that half way between the mirrors the advance of the beam at each reflection amounts substantially to the width of the beam, and a photocell positioned to be illuminated by said beam after said reflections.

2. Apparatus according to claim 1 further comprising bifurcated support means for said mirrors.

3. Apparatus according to claim 2 further comprising a housing supporting said source and mirror support means.

4. Apparatus according to claim 3 further comprising a prism disposed between said source and mirrors.

5. Apparatus according to claim 4 further comprising means to adjust the position of one of said mirrors with respect to the other.

6. Apparatus according to claim 1 further comprising a second photocell positioned to receive illumination from said source, and means responsive to the difference between the excitation of said photocells to control operation of the loom.

7. Apparatus according to claim 6 wherein said second photocell is supported in said housing.

8. Apparatus according to claim 6 further comprising a movable shutter disposed between said source and second photocell for adjustment of the illumination of the latter.

9. Apparatus according to claim 6 further comprising an amplifier and means to apply to said amplifier the output signals from said photocells, and loom control means responsive to differences between said signals above a minimum value.

10. Apparatus according to claim 9 further comprising means to activate said amplifier during a fraction of each loom cycle.

References Cited

UNITED STATES PATENTS

| | | | |
|---|---|---|---|
| 2,202,060 | 5/1940 | Mitchell | 250—221 X |
| 2,312,182 | 2/1943 | Meyer | 250—219 X |
| 2,438,365 | 3/1948 | Hepp et al. | 28—51 X |
| 2,989,796 | 6/1961 | Ashe | 28—51 |
| 3,365,699 | 1/1968 | Foster | 250—223 X |

RALPH G. NILSON, Primary Examiner

T. N. GRIGSBY, Assistant Examiner

U.S. Cl. X.R.

28—51; 66—163; 73—160; 250—221; 340—259